United States Patent Office 3,350,471
Patented Oct. 31, 1967

3,350,471
HEAVY AROMATIC ADDED TO THE FEED IN A NORMAL PARAFFIN MOLECULAR SIEVE SEPARATION PROCESS
Willard N. Mitchell, Baytown, Tex., assignor to Esso Research and Engineering Company
No Drawing. Filed Dec. 28, 1965, Ser. No. 517,110
9 Claims. (Cl. 260—676)

ABSTRACT OF THE DISCLOSURE

An aromatic heavier than any aromatics in the feed is added to the feed in a paraffin molecular sieve separation process. The heavy aromatic is adsorbed with the paraffins in preference to the lighter aromatics. The normal paraffins in the desorbate can then be separated from the heavier aromatics by fractional distillation.

---

The present invention is directed to the reduction in the aromatic hydrocarbon content of n-paraffin desorbate products. The present invention involves adding to the feed stream to a molecular sieve bed a minor amount of aromatic hydrocarbons which have a different boiling range from the desired n-paraffin product. Preferably, the added aromatic hydrocarbons will have a boiling range at least 20° F. higher than the upper limit of the boiling range of the desired n-paraffin product.

It has been found that by the laws of mass action, addition of aromatic hydrocarbons boiling above or below the range of the desired n-paraffin product can result (during adsorption) in a partial displacement from the sieve surface of aromatic hydrocarbons boiling in the same range as the desired n-paraffin product. The added aromatic hydrocarbon can then be separated from the product by simple fractionation. It has also been found that higher-boiling aromatic hydrocarbons are adsorbed on a molecular sieve preferentially to aromatic hydrocarbons having lower boiling points. Thus, addition of higher-boiling aromatic hydrocarbons is preferred, since the benefit of this preferential adsorption is obtained as well as the benefits of mass action.

Normal paraffins are currently employed for many purposes, from use as solvents to use as reactants in producing biodegradable detergents. In many uses, the n-paraffin purity must be very high (e.g., >97%). Further, the nature of the impurities making up the remaining 3% is sometimes important: in the production of biodegradable detergents, the presence of aromatic hydrocarbons is deleterious, since they interfere with sulfonation of the n-paraffins. In high-purity specialties of this nature, incremental increases in purity (and decreases in specified impurities) are of great commercial value. For example, to obtain a reduction in aromatic hydrocarbons, the n-paraffin desorbate product is sometimes hydrogenated, converting aromatics to naphthenes. However, there is sometimes an objection to the naphthenes as well as to the aromatic hydrocarbons. The present invention is an alternative to hydrogenation.

Hydrocarbons are retained by molecular sieve beds in at least three ways:

(1) n-paraffins pass through the 5 A. pores into a "cage" within the sieve, and are hereinafter referred to as "adsorbed in the pores";

(2) polar hydrocarbons are preferentially adsorbed on the exterior surface of the sieve exposed between the pore openings; and (3) hydrocarbons retained in the void volume of the sieve bed.

The recovery of n-paraffins by adsorption on molecular sieves has become well known. This recovery is accomplished by contacting a n-paraffin-containing hydrocarbon stream with a bed of sieve pellets, generally 1/16" or 1/8" in nominal diameter. The hydrocarbon feed stream is passed in contact with the bed for a short time, usually for a time sufficient to adsorb substantially all of the n-paraffins in the feed stream or long enough to substantially completely saturate the sieve bed with n-paraffins, depending on the amount of n-paraffins which are to be passed on with the sievate (i.e., hydrocarbons not adsorbed from the feed stream). The feed stream is discontinued. At this point the bed contains not only n-paraffins adsorbed in the sieve pores (and some of each type of hydrocarbon adsorbed on the sieve surface) but also contains a small amount of the feed stream retained in the void volume of the bed. The hydrocarbons retained in the void volume of the bed are hereinafter referred to as "physically trapped hydrocarbons." As is more specifically pointed out below, these physically trapped hydrocarbons are purged from the bed and discarded or recycled into the feed stream for a subsequent adsorption step.

Surface adsorption favors highly polar hydrocarbons such as the aromatic hydrocarbons. It is contemplated that alkyl-substituted aromatic hydrocarbons may be, at least in part, retained by the intrusion of the alkyl substituent into one of the 5 A. pores. This type of adsorption is herein considered to be a type of surface adsorption.

The adsorbed n-paraffins are released from the bed either by displacement by another material or by lowering the pressure to obtain a vacuum. Displacement is normally used for heavier n-paraffins, e.g., those in the $C_{11}$ to $C_{14}$ range. Ammonia gas has been found to be a good displacing material. For $C_6$ to $C_8$ n-paraffins, a vacuum desorption is suitable, e.g., employing a pressure of about 1 p.s.i.a. at a temperature of about 600° F.

Regardless of the mode of desorption which is employed, the first hydrocarbons which are removed from the bed are the physically trapped hydrocarbons from the feed stream. After they are removed, the adsorbed n-paraffins (and aromatics) are removed. Since the total volume of all hydrocarbons which are given up by a particular bed in each desorption can be determined, as well as the proportion of that total which is attributable to physically trapped hydrocarbons, it is possible to segregate the first portion which has essentially the same composition as the feed stream (but not always identical thereto), and subsequently to use it as part of the feed stream in a later adsorption step. As an example, it has been found satisfactory in one case to segregate the first 12% of the hydrocarbons recovered in a desorption step. This can be done by condensing the hydrocarbons and segregating a constant initial volume each time the bed is desorbed, or by diverting a given volume of vapors during the initial portion of the desorption step.

The desorbate product (the material recovered after segregation of the recycle hydrocarbons) is high in n-paraffins, but contains a minor amount of impurities, such as isoparaffins, cycloparaffins, and aromatic hydrocarbons. It has been found that the aromatic hydrocarbon level in the desorbate is consistent at about 0.5% to 2% by weight (usually 1% to 1.5%), regardless of the boiling range of the hydrocarbon feed stream.

Surprisingly, however, it has been found that the higher-boiling aromatic hydrocarbons are adsorbed preferentially to the lower boiling aromatic hydrocarbons so that, by distilling the desorbate to discard a high-boiling moiety, the aromatic content can be reduced and the n-paraffin purity is increased.

By the present invention, from 0.1% to 40% (by weight) of aromatic hydrocarbons having a boiling range different from the desired n-paraffin product are added to the feed stream to the sieve bed. Preferably from 5 to 15 weight percent will be added.

The added aromatic hydrocarbons may be pure or in an admixture (with other aromatic hydrocarbons or with inert substances). Normally, they will be one- or two-ring aromatic hydrocarbons, alkyl-substituted or unsubstituted, such as benzene, toluene, xylenes, ethylbenzene, trimethylbenzenes, naphthalenes, methylnaphthalenes, polymethylnaphthalenes, etc. A preferred admixture is comprised of $C_9$ aromatic hydrocarbons, as is set forth in the example.

Hydrocarbon feed streams to the sieve bed can boil within the range of 115° F. to 500° F.; for example, suitable feedstocks can be found in a stream containing $C_6$ hydrocarbons which have a boiling range of about 115° F. to about 160° F., or a kerosene stream having a boiling range of about 400° F. to about 500° F. A typical $C_6$-containing feed stream is more particularly described in the example.

The feedstream can contain from 10% to 60% n-paraffins in admixture with aromatic hydrocarbons, isoparaffins and cycloparaffins. The aromatic hydrocarbon content will normally be from about 1% to about 30%, although it can range as low as 0.1% and still present a problem.

The process is carried out in cycles, each cycle comprising an adsorption step and a desorption step.

The adsorption step will be carried out at a temperature and pressure sufficient to maintain in the vapor phase all hydrocarbons in the feedstock. Suitable temperatures will be found from 180° F. to 750° F. and suitable pressures from atmospheric to about 75 p.s.i.g. For a 150–160° F. stream, adsorption temperatures of 500° F. to 750° F. are preferred; for a 400–500° F. stream, temperatures of 550° F. to 750° F. are preferred. The feed stream is contacted with the sieve for a time sufficient to contact from 0.01 to 0.2 pound of n-paraffins in the feed stream per pound of sieve in the bed (preferably 0.05 pound/pound). The time required for this step can vary widely, but normally will be from 2 to 20 minutes.

The desorption step can be accomplished by evacuation to a pressure of about 0.5 to 14 p.s.i.a., or by using a sweep gas such as ammonia. When ammonia is used, a pressure of from subatmospheric to 100 p.s.i.g. can be employed at an ammonia rate sufficient to contact the bed with about 0.045 pound of ammonia per pound of sieve in the bed. In the desorption step, the temperature will remain substantially the same as in the adsorption step to minimize fluctuations in the temperature of the bed.

The first 10% to 15% of the hydrocarbons removed during desorption is segregated for use as a recycle stream. This portion represents material physically trapped in the sieve bed and has essentially the same composition as the feed stream. This purged product may be considered to be mere displacement of material from the void volume of the bed.

The remaining material is the desorbate product, high in n-paraffins, in which at least a portion of the aromatic hydrocarbons which normally would have been included have been replaced by added aromatic hydrocarbons (which can be easily separated by fractionation).

The desorbate product is fractionated to remove the added aromatic hydrocarbons. The cut point will depend on the particular aromatics which have been added, as well as the boiling range of the desired n-paraffin product. Where a $C_6$ stream is used as a feed stream (boiling 150° F. to 160° F.), with an admixture of $C_9$ aromatic hydrocarbons being added, the fractionation step may be accomplished by removing a 160° F.+stream. This will separate the added aromatics from the n-paraffin product.

*Example*

In order to illustrate the present invention, take a hydrocarbon stream boiling within the range of 115° F. to 161° F., which contains n-hexane and n-pentane in admixture with aromatic hydrocarbons, naphthenes, and isoparaffins, and which has the following characteristics:

| | |
|---|---|
| Gravity, ° API at 60° F. | 78.7 |
| K.B.* | 31.3 |
| Engler Distillation, ° F.: | |
| IBP | est__ 115 |
| 5% | 124 |
| 10% | 126 |
| 20% | 128 |
| 30% | 131 |
| 40% | 134 |
| 50% | 137 |
| 60% | 141 |
| 70% | 145 |
| 80% | 150 |
| 90% | 155 |
| 95% | 158 |
| Dry point | 161 |
| Total aromatics content all benzene _percent__ | 3.3 |

* Kauri-Butanol value, a measure of solvency.

To this hydrocarbon stream will be added an admixture of $C_9$ aromatic hydrocarbons (boiling from 306° F. to 349° F.) which has the following constituency:

| | Vol. percent |
|---|---|
| 1,2,4-trimethylbenzene | 40.8 |
| 1,2,3-trimethylbenzene | 6.9 |
| 1,3,5-trimethylbenzene | 7.4 |
| 1-methyl-3-ethylbenzene and 1-methyl-4-ethylbenzene | 23.3 |
| 1-methyl-2-ethylbenzene | 13.8 |
| Isopropyl benzene | 2.6 |
| n-Propylbenzene | 5.2 |
| | 100.0 |

The $C_9$ aromatic hydrocarbon mixture is added to the hydrocarbon stream in two proportions: first, as 5 weight percent based on the weight of the hydrocarbon stream, and secondly, as 15 weight percent based on the weight of the hydrocarbon stream. The admixture thus obtained will constitute a feed stream for contact with a bed of molecular sieve.

The molecular sieve employed is manufactured by Linde Division of Union Carbide and Carbon Company and is sold under the name "Linde Molecular Sieve Type 5A." It has an empirical formula of

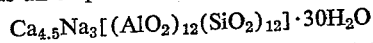

$$Ca_{4.5}Na_3[(AlO_2)_{12}(SiO_2)_{12}] \cdot 30H_2O$$

The molecular sieve is employed as one-eighth-inch pellets in a fixed bed, and is contacted by the feed stream in the vapor phase by passing the feed stream upflow in contact with the sieve pellets.

The adsorption in the vapor phase is carried out at a temperature of about 600° F. and a pressure of about 15 p.s.i.g., for a time of about 10 minutes, which is sufficient to adsorb on the bed of pellets about 0.03 pound of n-paraffin per pound of molecular sieve. The adsorbed n-paraffins will be mostly n-hexane and n-pentane. Also, other hydrocarbons will remain physically trapped in the void volume of the bed. These trapped hydrocarbons will have essentially the same constitution as the feed stream being passed through the bed.

After the adsorption has become complete, the flow of the vaporized feed stream is terminated, and thereafter a stream of ammonia gas is passed downflow in contact with the bed of molecular sieve at a temperature of about 600° F. and at a pressure of about 5 p.s.i.g. The flow of ammonia gas is continued until about 0.045 pound of ammonia per pound of sieve bed has been used.

In order to remove the hydrocarbons which are physically trapped in the bed, in the void volume thereof, the first portion of ammonia vapor passing from contact with the bed is segregated in an amount sufficient to collect a hydrocarbon product amounting to about 12% of the total liquid hydrocarbon product obtained from the bed. After this first portion has been collected, a second portion is separately collected which comprises the remainder of the hydrocarbons being carried from the bed in the ammonia stream. By this procedure, the hydrocarbons physically trapped in the bed are first collected as a segregated stream so that they will not appear as impurities in the final product. The second product, which is the desorbate of the n-paraffins which had been adsorbed on the sieve, along with small amounts of isoparaffins and aromatic hydrocarbons which had at least in part been adsorbed on the surface of the sieve, is available for a fractionation step whereby a n-hexane product stream can be obtained having a smaller aromatic hydrocarbon content than would be the case if no $C_9$ aromatic hydrocarbon had been added.

Fractionate the desorbate product to obtain a stream boiling within the range of 154° F. to 159° F. The n-hexane product stream thus obtained will have the following inspection for aromatic hydrocarbons:

| | Feed | Desorbate Product | | | | | |
|---|---|---|---|---|---|---|---|
| | | 0% $C_9$ Fractionation | | 5% $C_9$ Fractionation | | 15% $C_9$ Fractionation | |
| | | Before | After | Before | After | Before | After |
| Total aromatics | 3.3 | 1.25 | 1.25 | 1.25 | 0.33 | 1.25 | 0.15 |
| Benzene | 3.3 | 1.25 | 1.25 | 0.33 | 0.33 | 0.15 | 0.15 |
| $C_9$ aromatics | 0 | 0 | 0 | 0.92 | 0 | 1.10 | 0 |

Thus, it is seen that where no $C_9$ aromatic hydrocarbons were added, the desorbate n-hexane product contained 1.25% aromatic hydrocarbons (benzene). Where 5% of the $C_9$ aromatic mixture was added, the desorbate product before fractionation contained 1.25% aromatic hydrocarbons, but after fractionation the n-hexane product contained only 0.33% benzene. Where 15% $C_9$ aromatic hydrocarbons were added, the n-hexane product contained only 0.15% benzene after fractionation.

Thus, it is seen that the present invention provides a method whereby the aromatic content of a n-paraffin product from a molecular sieving operation can be substantially reduced.

I claim:
1. In the process of recovering normal paraffins from a hydrocarbon stream containing normal paraffins in admixture with aromatic hydrocarbons boiling in the same range as said normal paraffins and at least one hydrocarbon chosen from the group consisting of cycloparaffins and isoparaffins
  comprising the steps of contacting said hydrocarbon stream in the vapor phase with a molecular sieve having pores of substantially uniform size and about 5 Angstroms in diameter, and desorbing a normal paraffin-rich desorbate from said sieve,
the improvement of
  adding to said hydrocarbon stream before contact with said sieve
  at least one aromatic hydrocarbon having a boiling point outside the boiling range of a desired high-purity normal paraffin product and higher than that of the aromatic hydrocarbons in said hydrocarbon stream,
  in amounts of from 0.1% to 40% by weight based on the weight of said hydrocarbon stream,
  whereby at least a portion of said added aromatic hydrocarbon will be retained on said sieve in preference to at least a portion of said aromatic hydrocarbons boiling in the same range as said normal paraffins and fractionating said desorbate to separate said added aromatic hydrocarbons from said desired high-purity normal paraffins product.

2. A process in accordance with claim 1 wherein the added aromatic hydrocarbons are added in amounts of from 5% to 15% by weight based on the weight of said hydrocarbon stream.

3. A process in accordance with claim 1 wherein the added aromatic hydrocarbon has a boiling point at least 20° F. higher than the upper limit of the boiling range of said desired high-purity normal paraffin product.

4. A process in accordance with claim 1 wherein said hydrocarbon stream has an Engler boiling range within the range from 115° F. to 500° F.

5. A process in accordance with claim 1 wherein said hydrocarbon stream has an Engler boiling range within the range from 150° F. to 160° F.

6. A process in accordance with claim 1 wherein said hydrocarbon stream has an Engler boiling range within the range from 400° F. to 500° F.

7. A process in accordance with claim 1 wherein:
said hydrocarbon stream has a boiling range of about 150° F. to about 160° F.,
said added aromatic hydrocarbon is an admixture of $C_9$ aromatic hydrocarbons
  which have been added in amounts of about 5% by weight based on the weight of said hydrocarbon stream
the adsorption step is carried out by contacting said hydrocarbon stream and said added aromatic hydrocarbon with a synthetic zeolite molecular sieve having an empirical formula of

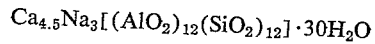

at a temperature within the range from about 500° F. to about 750° F.
a pressure from about atmospheric to about 75 p.s.i.g.
for a time within the range of about 2 to about 20 minutes,
  whereby from about 0.01 to about 0.1 pound of normal paraffins is adsorbed per pound of molecular sieve,
said molecular sieve is purged of hydrocarbons in the void volume thereof,
said molecular sieve is desorbed of adsorbed hydrocarbons,
said desorption being accomplished at a temperature in the same range as the adsorption temperature,
and said fractionation is carried out to recover a high-purity normal paraffin product boiling below 160° F.

8. A process of recovering a high-purity n-hexane product from a hydrocarbon stream boiling within the range of 115° F. to 161° F. and which contains n-hexane and n-pentane in admixture with aromatic hydrocarbons and at least one hydrocarbon chosen from the group consisting of naphthenes and isoparaffins which comprises
contacting a feed stream consisting of an admixture of said hydrocarbon stream and from 5 to 15 weight percent of $C_9$ aromatic hydrocarbons
in the vapor phase
at a temperature of about 600° F.
and a pressure of about 15 p.s.i.g.
with a bed of one-eighth-inch pellets of a synthetic zeolite molecular sieve having pores of substantially uniform size and about 5 A. in diameter
  for a time of about 10 minutes which is sufficient to adsorb on said bed about 0.03 pound of normal paraffins per pound of molecular sieve,
desorbing from said bed the hydrocarbons physically trapped in the void volume thereof by passing a stream of ammonia gas through said bed at a temperature of about 600° F. and a pressure of about 5 p.s.i.g. until about 0.045 pound of ammonia per pound of bed has been used, withdrawing a first portion of said ammonia stream from said bed as a purge stream,
withdrawing the remainder of said ammonia stream from said bed as a desorbate stream
condensing the desorbate,
fractionating said desorbate to obtain a n-hexane product stream boiling within the range of 154° F. to 159° F.
and a $C_9$ aromatic hydrocarbon-containing stream boiling above 160° F.

9. A process in accordance with claim 8 wherein the desorbed hydrocarbon in said first portion of said ammonia stream amounts to about 12% of the total hydrocarbons desorbed from said bed.

References Cited
UNITED STATES PATENTS

| | | | |
|---|---|---|---|
| 2,888,394 | 5/1959 | Christensen et al. | 208—310 |
| 2,909,582 | 10/1959 | Bleich et al. | 208—310 |
| 2,935,459 | 5/1960 | Hess et al. | 208—310 |

DELBERT E. GANTZ, *Primary Examiner.*

HERBERT LEVINE, *Examiner.*